United States Patent Office

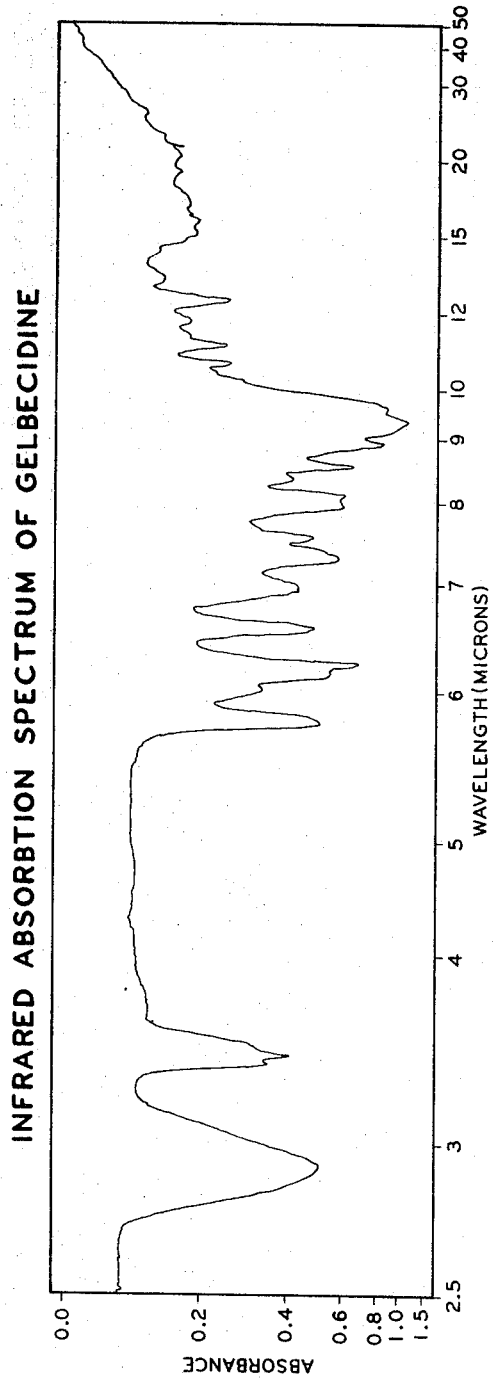

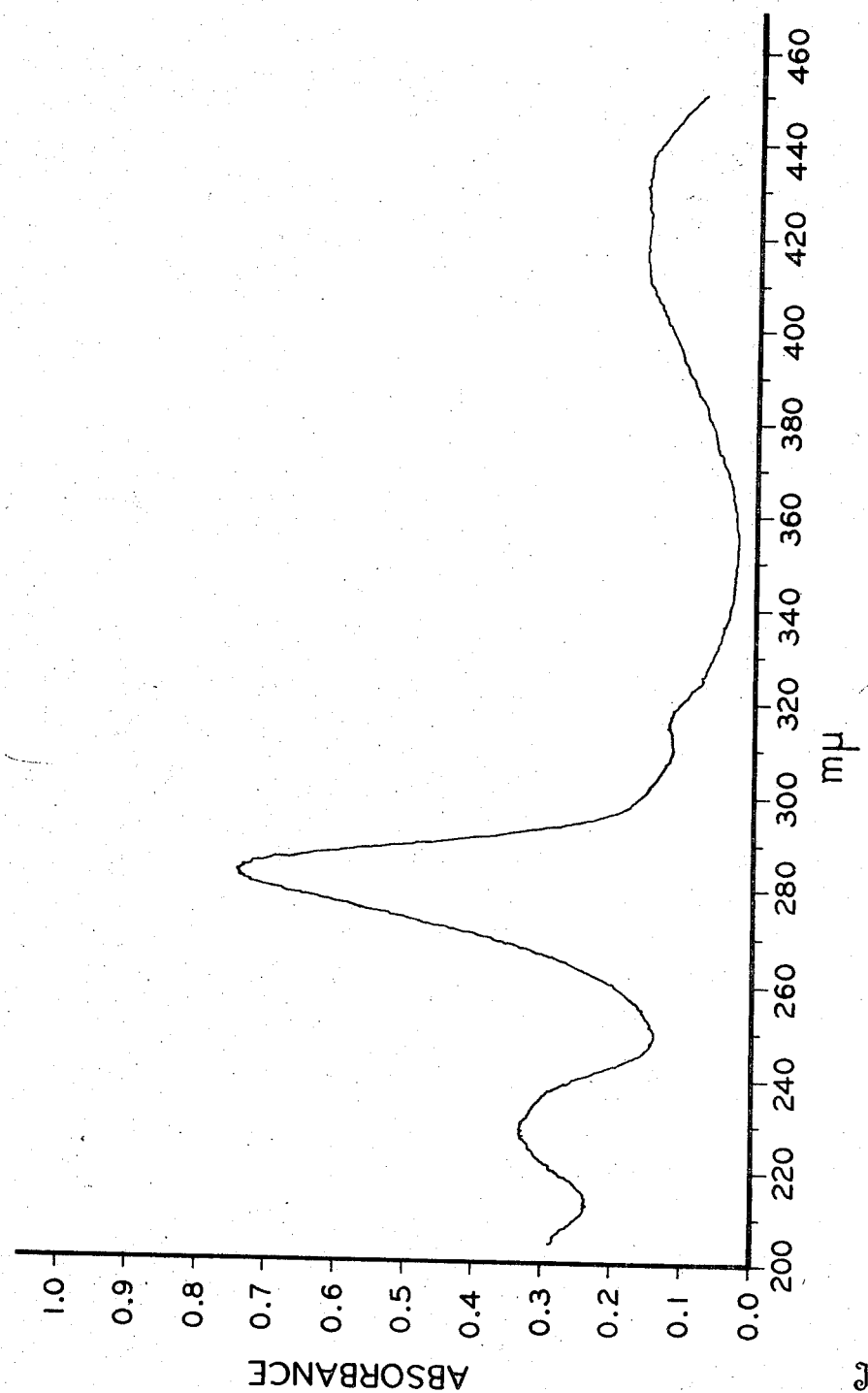

3,551,561
Patented Dec. 29, 1970

3,551,561
GELBECIDINE AND A PROCESS FOR MAKING THE SAME
Adorjan Aszalos, Kendall Park, Robert S. Robison, North Brunswick, Felix E. Pansy, Jamesburg, and Bernard Berk, Westfield, N.J., assignors to E. R. Squibb & Sons, Inc., New York, N.Y., a corporation of Delaware
Filed Aug. 29, 1968, Ser. No. 756,181
Int. Cl. A61k 21/00
U.S. Cl. 424—119    2 Claims

ABSTRACT OF THE DISCLOSURE

An antibiotic selected from the group consisting of gelbecidine, said gelbecidine being an amorphous, yellow material having the following elemental analysis (percent): C, 56.98; H, 6.93; O, 36.09; a melting point (with decomposition) at 169 to 170° C.; a sintering point of 161° C.; which is soluble in trichloromethane, ethyl acetate, ethanol, methanol and acetone; and which possesses an infrared absorption spectrum and an ultraviolet absorption spectrum as shown in FIGS. 1 and 2, respectively. Gelbecidine is useful as an antimicrobial agent.

---

This invention relates to a new and useful antibiotic and more particularly to the new antibiotic, gelbicidine, in its various forms.

Gelbecidine is formed by cultivation, under controlled conditions, of a microorganism which is a species of the genus Streptomyces. This Streptomyces species was obtained from a soil sample collected in Parma, Idaho, and samples of a living organism have been deposited without restriction in, and made a part of, the American Type Culture Collection, Rockville, Md., and the culture collection of the Northern Utilization Research Branch of the Department of Agriculture, Peoria, Ill., from whence it is available under Accession Nos. ATCC 21309 and NRRL 3458, respectively.

MICROORGANISM

Streptomyces Sc 3740 develops abundantly in culture media usually employed for cultivation of other organisms of the same genus. It is capable of growing at temperatures in the range of about 20° C. to 30° C., preferably at a temperature of 25° C., on an agar slant medium which is prepared by admixing 20 g. of tomato paste, 20 g. of oatmeal, and 500 ml. of boiling water, cooking this mixture to a thin gruel, filtering, adding the filtrate to 15 g. of agar in 500 ml. of water, and sterilizing the resultant mixture at 121° C. and 15 lbs. steam pressure for 20 minutes. On this media the aerial mycelium is yellowish brown and a light brown soluble pigment is produced.

It is to be understood that the invention is not limited to the use of the particular organism herein described, but includes inter alia variations and mutants obtained by treatment of the microorganism with, for instance, ultraviolet rays, X-rays, manganese chloride, camphor, nitrogen mustards, and the like, as well as polyploids of the various mutants.

FERMENTATION

The environment and nutritional requirements for the fermentation of Streptomyces sp. ATCC 21309 are similar to those necessary for the production of antibiotics by other aerobic microorganisms. Thus, aerobiosis can be sustained in a liquid nutrient medium inoculated with a sterile culture incubated in flasks placed on shaking machines. For industrial production, metal tanks with internal aeration and agitation by means of paddles can be substituted. Gelbecidine can also be produced by surface cultivation. The microorganism requires as nutrient elements, one or more sources of energy and carbon, organic nitrogenous substances and mineral salts. Cultivation is best effected when the initial pH of the culture medium is between 5.5 and 8.5, the optimum pH being around 7.0.

The utilizable sources of carbon for the production of the antibiotic are very diverse, there being included inter alia sugars (such as glucose, lactose, maltose, sucrose), dextrin, starches of different types or origin, glycerol (and other polyalcohols), inositol and aniaml and vegetable fats, as well as esters thereof. The sources of organic nitrogen which actively stimulate growth and favor production of gelbecidine are substance such as soybean meal, cotton meal and other vegetable meals (whole or partially or totally defatted), meat flours or animal viscera, various peptones, casein hydrolysates, soybean hydrolysates, yeast hydrolysates, lactalbumin, wheat glutins, distillers solubles, corn steeps, urea and amino acids.

Mineral salts, such as the chlorides, nitrates, sulfates, carbonates and phosphates of sodium, ammonium and calcium, can be included in appropriate concentrations. The nutritive medium should contain traces of metals such as magnesium iron, copper, manganese, zinc and cobalt.

For the adjustment of pH during the course of the fermentation, it is preferred to add buffering agents, such as calcium carbonate. If necessary, an antifoaming agent may be added to the fermentation medium.

Under the described conditions and with the temperature of cultivation at about 25° C., maximum production of gelbecidine is obtained between 1 and 5 days in tanks.

The inoculum for the fermentation can be provided from suspensions of spores or of lyophilized mycelium, freeze-dried with an inert substrate. It is usually transferred through one or more passages in liquid media before the final fermentation.

ISOLATION OF GELBECIDINE

Gelbecidine can be recovered in good yield from the crude or centrifuged fermentation broth at a pH between 5 and 8.

Gelbecidine can be recovered from the resulting filtered broth by extraction with a variety of solvents such as chloroform, ethyl acetate, butanol, etc. The resulting extract is then taken to dryness, and the resultant gummy material triturated first with hexane and then wih ether. The hexane and ether insoluble material is then extracted with ethyl acetate, and the resulting ethyl acetate solution extracted in turn with 1 N sodium bicarbonate solution and 1 N hydrochloric acid solution and finally with distilled water. The ethyl acetate solution is evaporated to dryness to yield a yellowish brown powder.

Further purification is achieved by subjecting the resulting yellow-brown powder to adsorptive chromatography over activated alumina and several reprecipitation steps.

CHEMICAL AND PHYSICO-CHEMICAL PROPERTIES OF GELBECIDINE

Gelbecidine is a yellow, amorphous material. It sinters at 161° C. and melts with decomposition at 169–170° C.

Gelbecidine is a neutral compound. It cannot be extracted into alkaline or acidic water from its organic solvent solutions. Gelbecidine gives a positive Fehling test and a negative test for phenol groups with 1 percent aqueous ferric chloride. It is soluble in $CHCl_3$, EtOAc, ethanol, methanol and acetone, but it is insoluble in water or hexane.

Elemental analysis gives the following results (percent): C, 56.98; H, 6.93; O, 36.09 (by difference). No sulfur, halogen or nitrogen were found in gelbecidine preparations. $[a]_D^{26} = +140$ ($CHCl_3$, 1 percent).

Gelbecidine shows absorption in its ultraviolet spectrum (FIG. 1) at 228, 283, 316, 416, and 432 mµ, with corresponding $E_{1cm}^{1\%}$. values of 203, 412, 66, 84 and 84

The infrared spectrum of gelbecidine (FIG. 2) indicates the presence of hydroxyl, CH, carbonyl and aromatic groups. Characteristic absorptions are at 2.95, 3.43, 3.5, 5.75, 6.13, 6.3, 6.92, 7.3, 7.95, 8.12, 8.92, 9.62, 10.6 and 11.6 microns.

Preparations of gelbecidine move as single spots in different chromatographic systems, as detected by ultraviolet and visible light and bioautography. Paper chromatographic results: Whatmann No. 1 and solvent system BuOH:AcOH:H$_2$O=4:1:5 R$_f$ .94, and solvent system MeOH:benzene=4:6 R$_f$ .8. Thin layer chromatographic results: Eastman Chromagram sheets, solvent MeOH R$_f$ .6 and solvent MeOH:CHCl$_3$=1:9 R$_f$ .45.

ANTIMICROBIAL PROPERTIES

Gelbecidine shows the following in vitro spectrum:

Table I

| Organism | MIC in mcg./ml. |
|---|---|
| S. aureus | 0.39 |
| S. pyogenes | 0.47 |
| P. vulgaris | 5.0 |
| Ps. aeruginosa | 5.0 |
| E. coli | 5.0 |
| S. schottmuelleri | 5.0 |
| C. albicans | 5.0 |
| F. bulbigenum | 5.0 |
| T. mentagrophytes | 5.0 |
| T. vaginalis | 5.0 |

Thus, gelbecidine is useful as an antibacterial agent against gram-positive microorganisms such as those set forth above.

Gelbecidine may thus be employed as a surface disinfectant. For this purpose it is dissolved, preferably also containing a detergent or other cleansing agent, at a concentration of about 0.1 to about 10.0 percent, preferably about 0.5 to about 1.0 percent by weight. Such solutions may then be employed as washes to disinfect floors, walls, tables, and the like, as well as in the cleaning of dairy or food processing equipment.

The following example illustrates the preparation and isolation of gelbecidine:

EXAMPLE

The microorganism Streptomyces ATCC 21309 was isolated from a soil sample obtained from Parma, Idaho, by conventional plating techniques. It is maintained on an agar slant medium made from 20 g. of tomato paste, 20 g. of oatmeal, 500 ml. of boiling water, which are cooked to a thin gruel, filtered, then added to 15 g. of agar in 500 ml. of water and sterilized at 121° C. and 15 pounds steam pressure for 20 minutes. On this medium, the aerial mycelium is yellowish brown and a light-brown soluble pigment is produced.

A portion of the growth from well-sporulated slant suspended in 0.01 percent Dupanol solution is used to inoculate 50 ml. of sterilized broth in a 250 ml. flask. The browth has the following composition (on a weight basis):

| | Percent |
|---|---|
| Soybean meal | 1.5 |
| Dehydrated mashed potatoes | 1.5 |
| Glucose | 5.0 |
| CoCl$_2$·2H$_2$O | 0.0005 |
| CaCO$_3$ | 1.0 |

Distilled water to 1000 ml.

After 48 hours incubation at 25° C. on a rotary shaker, the contents of the flask are transferred to 1000 ml. of the above sterile medium in a 4000 ml. flask. After 48 hours incubation on a rotary shaker at 25° C., the entire contents of the flask are used to inoculate 30 liters of the above same sterile medium contained in a 10 gallon fermentor.

The fermentation is continued for 118 hours at 25° C. The air rate is 2.0 ft./minute superficial air velocity and agitation equivalent to 0.2 HP/100 gal. is used.

After 118 hours of fermentation, the whole broth is filtered with the addition of filter aid. Since most of the antibiotic is in the filtrate, the cake is discarded. The filtrate is extracted with chloroform, and the organic phase is taken to dryness. The residual gummy material is triturated with hexane and then with ether. The hexane and ether insoluble material—about 1 g. per 35 liters of fermentation broth—is dissolved in 200 ml. EtOAc. This EtOAc solution is extracted five times (100 ml. each) with 1 N sodium bicarbonate solution. The EtOAc solution is then extracted three times with 100 ml. each of distilled water. The organic phase is dried over anhydrous Na$_2$SO$_4$ and is taken to dryness.

The resulting yellow-brown powder—about 0.5 g. from a 35 liter fermentation broth—is dissolved in 5 ml. MeOH and chromatographed on neutral alumina (200 g. alumina/ 1 g. material). The fractions containing the biological activity are combined and taken to dryness. The resulting yellow powder is dissolved in CHCl$_3$ and applied to a column of silica gel of 28–200 mesh size. A yellow band is eluated with 10 percent MeOH in CHCl$_3$. The eluate fraction containing this band is taken to dryness. The resulting powder is dissolved in a minimum amount of CHCl$_3$ and precipitated with five volumes of hexane. Solids are recovered by centrifugation and are dried in vacuum at 35° C. The final product is an amorphous bright yellow powder.

The invention may be variously otherwise embodied within the scope of the appended claims.

What is claimed is:

1. An antibiotic named gelbecidine, said gelbecidine being an amorphous, yellow material having the following elemental analysis: C, 56.98; H, 6.93; O, 36.09; a melting point, with decomposition, in the range of 169–170° C.; a sintering point of 161° C.; which is soluble in methanol, ethanol, acetone, ethyl acetate, and trifluoromethane; which is insoluble in water and hexane; and which possesses an infrared absorption spectrum and an ultraviolet absorption spectrum as shown in FIGS. 1 and 2, respectively.

2. A process for producing gelbecidine as defined in claim 1, which comprises culturing Streptomyces species ATCC 21309 under aerobic conditions in an aqueous nutrient medium comprising an assimilable, fermentable carbohydrate and assimilable nitrogen source until a substantial amount of the antibiotic is accumulated, and recovering gelbecidine from the medium.

References Cited

Abstracts of Papers, 8th Interscience Conference on Antimicrobial Agents and Chemotherapy, New York, October 1968, p. 17.

JEROME D. GOLDBERG, Primary Examiner

U.S. Cl. X.R.

195—80